UNITED STATES PATENT OFFICE.

MARTIN EKENBERG, OF STOCKHOLM, SWEDEN.

PROCESS OF SEPARATING CONSTITUENTS OF SUINT.

SPECIFICATION forming part of Letters Patent No. 558,788, dated April 21, 1896.

Application filed October 16, 1893. Serial No. 488,267. (No specimens.) Patented in England September 18, 1893, No. 17,565.

*To all whom it may concern:*

Be it known that I, MARTIN EKENBERG, a subject of the King of Sweden and Norway, and a resident of Stockholm, Sweden, have invented certain new and useful Improvements in Methods of Separating Fats, (for which a patent has been granted to me in Great Britain, No. 17,565, dated September 18, 1893,) of which the following is a specification.

This invention relates to the separation of fats or fatty bodies having different melting-points from products containing them—such, for example, as wool-fat; and the object of the invention is to provide a method of operation whereby such separation can be simply and economically effected.

Neutral wool-fat, freed from glycerides, consists, as is well known, of a mixture of several ethers, free cholesterin, and cholesterids, or compounds of cholesterin with various fatty acids. The melting-point of the mixture varies between 38° and 46° centigrade, being generally above 40° centigrade. If wool-fat be melted, cooled, and submitted to fractional pressure at a suitable temperature, the fats of different melting-points contained therein may be separated. The fats separated in this manner are three in number, as follows: Cholaine, which is believed to be a cholesterin-elain acid ether melting at 25° to 29° centigrade; cholepalmin, which is believed to be a cholesterin-palmitin acid ether, melting at 37° to 38° centigrade; and cholecerin, which is believed to be a cholesterin-cerotin acid ether, melting at 49° to 55° centigrade. This last body resembles beeswax, and varies in color from a light yellow-green to white. The exact chemical composition of these bodies has not, so far as I am aware, been determined.

In carrying out my invention the wool-fat is melted and slowly cooled to from 30° to 35° centigrade in molds, so as to form thin cakes or tablets, which are then pressed at a temperature of 30° to 35° centigrade, either in heated presses or under centrifugal action. By this operation that portion of the fat which melts below the temperature (30° to 35° centigrade) employed will be removed and will be found to consist to the extent of about sixty per cent. of cholain or cholesterin-elain acid ether. The temperature is then raised to about 40° to 45° centigrade, at which temperature another portion of the wool-fat will be pressed out, consisting to the extent of about sixty per cent. of cholepalmin or cholesterin-palmitin acid ether. In lieu of raising the temperature of the mass at the second operation to 40° to 45° centigrade, it may be, if found more convenient, first melted and then slowly cooled to about 40° to 45° centigrade. The object is to press it at this temperature, and it is not material to my invention how the proper temperature is attained. The remaining portion or residue of the wool-fat will be found to consist to the extent of about sixty per cent. of cholecerin or cholesterin-cerotin acid ether, a considerable percentage of the other part being cholesterin.

The object I have in view in first melting and then cooling the fat to a certain temperature is this: The melted wool-fat must be considered as a solution composed of constituents having relatively high melting-points in others having lower melting-points. When such a solution is slowly cooled below the melting-point, the constituents having the higher melting-points crystallize; but if the cooling is too rapid the said constituents pass into a colloidal form and the constituents having a lower melting-point cannot be readily separated therefrom by pressure. By first melting the fat and then cooling it down to the proper point the pressing operation may be performed at a temperature considerably below the melting, as the temperature of wool-fat may be reduced considerably below the melting-point of the mass before it congeals—that is to say, there is a material interval between the congealing and melting points.

The separation of these fatty bodies may in some cases be facilitated by adding to the wool-fat a solvent or mixture of solvents previously to heating and applying pressure, and in this way the cholesterids or compounds of cholesterin with the various fatty acids may also be separated from the several fats contained therein. Such solvents may be volatile—such as, for example, hydrocarbons—or may be non-volatile, as fatty oils and acids, for example.

If fatty oils are used, the solvent and fat will be removed by pressure from the mixture of fats melting at a higher temperature, after which the solvent may be removed from the separated fat by saponification.

If fatty acids are used—such as stearic and palmitic acids, for example—the crystallization of the fats which melt at the higher temperatures is greatly facilitated and the cholain or cholesterin-elain acid ether may be readily pressed out.

It is not always essential that the fats cholepalmin or cholesterin-palmitin acid ether and cholecerin or cholesterin-cerotin acid ether shall be separated from one another, as above described, for this mixture may in certain cases be employed in the manufacture of candles.

Having thus described my invention, I claim—

1. The herein-described method of separating wool-fat into its constituent fatty bodies, which consists in first melting the wool-fat and then cooling it to a temperature of from 30° to 35° centigrade and subjecting it at said temperature to pressure whereby the cholain, or cholesterin-elain acid ether is separated, and then heating the residue to a temperature of from 40° to 45° centigrade and subjecting it to pressure, whereby the cholepalmin, or cholesterin-palmitin acid ether is separated, substantially as set forth.

2. The herein-described method of separating wool-fat into its constituent fatty bodies, which consists in adding to the wool-fat a solvent for the fatty body or bodies to be separated and then subjecting said wool-fat to pressure at a temperature corresponding to the melting-point of said fatty body or bodies, substantially as set forth.

3. The herein-described method of separating wool-fat into its constituent fatty bodies which consists in adding to the wool-fat a non-volatile solvent, then subjecting the mass to pressure at a temperature corresponding to the melting-point of the fatty body or bodies to be separated, whereby the same are separated and held in solution, and finally removing the solvent by saponification, substantially as set forth.

In witness whereof I have hereunto signed my name in the presence of two subscribing witnesses.

MARTIN EKENBERG.

Witnesses:
CARL CECECLE,
JOHS GRASENINT.